United States Patent
Hwang et al.

(10) Patent No.: US 8,204,142 B2
(45) Date of Patent: Jun. 19, 2012

(54) PRECODER AND PRECODING METHOD IN A MULTI-ANTENNA SYSTEM

(75) Inventors: In-Soo Hwang, Yongin-si (KR);
Jong-Hyung Kwun, Seongsam-si (KR);
Sei-Joon Shim, Austin, TX (US);
Chan-Byoung Chae, Austin, TX (US);
Robert Heath, Jr., Austin, TX (US)

(73) Assignees: Samsung Electronics Co., Ltd, Suwon-si (KR); Board of Regents, The University of Texas System, Austin, TX (US)

( * ) Notice: Subject to any disclaimer, the term of this patent is extended or adjusted under 35 U.S.C. 154(b) by 1063 days.

(21) Appl. No.: 12/021,488

(22) Filed: Jan. 29, 2008

(65) Prior Publication Data

US 2008/0181285 A1    Jul. 31, 2008

(30) Foreign Application Priority Data

Jan. 29, 2007   (KR) .................. 10-2007-0009090

(51) Int. Cl.
*H04B 7/02* (2006.01)
(52) U.S. Cl. ..................................... 375/267
(58) Field of Classification Search ............ 375/267, 375/299, 260
See application file for complete search history.

(56) References Cited

U.S. PATENT DOCUMENTS

| 7,672,384 | B2* | 3/2010 | Giannakis et al. | 375/260 |
| 2006/0034164 | A1* | 2/2006 | Ozluturk | 370/208 |
| 2006/0039489 | A1* | 2/2006 | Ikram et al. | 375/260 |
| 2006/0098760 | A1* | 5/2006 | Shen et al. | 375/299 |
| 2007/0014378 | A1* | 1/2007 | Parhi et al. | 375/267 |
| 2007/0211813 | A1* | 9/2007 | Talwar et al. | 375/267 |
| 2008/0013610 | A1* | 1/2008 | Varadarajan et al. | 375/221 |
| 2008/0112500 | A1* | 5/2008 | Pan et al. | 375/267 |
| 2009/0175375 | A1* | 7/2009 | Zhang | 375/267 |

FOREIGN PATENT DOCUMENTS

| KR | 10-2005-0020576 A | 3/2005 |
| KR | 10-2005-0082153 A | 8/2005 |

OTHER PUBLICATIONS

Boccardi et al, The p-Sphere Encoder: Vecor Precodign with Low Peak-Power for MIMO Guassian Broadcast Channel, In Proc. Allerton Conference on Communication, Control, and Computing 2005, Allerton, IL,Sep. 2005.*

(Continued)

*Primary Examiner* — Jaison Joseph
(74) *Attorney, Agent, or Firm* — Jefferson IP Law, LLP

(57) ABSTRACT

A precoder and a precoding method in a multiuser multi-antenna system are provided. The precoder includes a channel checker for determining a DownLink (DL) channel condition of terminals in a service coverage area, a pre-compensator for pre-compensating, for channel distortion, signals to be sent to the terminals when a nonlinear algorithm is selected based on the channel condition of the terminals, and an interference remover for canceling interference in a channel by multiplying the pre-compensated signals by inverse channels of the terminals, and for canceling interference between the terminals. Accordingly, the pre-equalization can be carried out without global channel state information, and an increase of the transmit power can be prevented in the permutation.

20 Claims, 12 Drawing Sheets

OTHER PUBLICATIONS

Hochwald et al., A Vector-Perturbation Technique for Near-Capacity Multiantenna Multiuser Communication Part II: Perturbation, IEEE Transactions on Communications, vol. 53, No. 3, Mar. 2005.*

Hochwald et al., A Vector-Perturbation Technique for Near-Capacity Multiantenna Multiuser Communication Part I: Channel Inversion and RegularizationPerturbation, IEEE Transactions on Communications, vol. 53, No. 1, Jan. 2005.*

* cited by examiner

PRECODER AND PRECODING METHOD IN A MULTI-ANTENNA SYSTEM

PRIORITY

This application claims the benefit under 35 U.S.C. §119(a) of a Korean patent application filed in the Korean Intellectual Property Office on Jan. 29, 2007 and assigned Serial No. 2007-9090, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) Board of Regents, The University of Texas System.

BACKGROUND OF THE INVENTION

1. Field of the Invention

The present invention relates generally to a precoder and a precoding method in a multi-antenna system. More particularly, the present invention relates to a precoder and a precoding method for canceling interference of multiple terminals in a multiuser multi-antenna system.

2. Description of the Related Art

As a result of the rapid growth of the wireless mobile communication industry and the increasing demand for the provision of various multimedia services in a wireless environment, there is an increasing need for communication systems capable of transmitting large amounts of data at a high data rate. In accordance with the need for the transmission of large amounts of data at a high data rate transmission for the provision of multimedia services, research is being conducted on a multi-antenna system (e.g., Multiple Input Multiple Output (MIMO) system) for efficiently utilizing limited frequency resources.

Compared to a single-antenna system, the multi-antenna system is able to increase transmission reliability and data rate by sending data over independent channels via antennas without allocating additional frequencies or transmit power. Moreover, the multi-antenna system can be extended to a multiuser multi-antenna system which supports a plurality of users.

The multiuser multi-antenna system can further increase the frequency efficiency such that multiple users can share the space resources acquired through the use of multiple antenna.

In the multiuser multi-antenna system, a transmitting end precodes and transmits data to prevent interference among the users.

For example, the transmitting end adopts a linear approach such as Zero Forcing (ZF) scheme, Minimum Mean Square Error (MMSE) scheme or a block diagonalization, to mitigate interference among the users.

In addition, the transmitting end adopts a nonlinear approach such as dirty paper coding or Tomlinson-Harashima precoding, to mitigate interference among the users.

If the ZF or the MMSE precoding is used to cancel interference among the users in the multiuser multi-antenna system, implementation of the transmitting end can be simplified. When the users' respective channels are not mutually orthogonal, however, the transmitting end suffers from enhancement of the transmitting signal power due to channel inversion.

If the multiuser multi-antenna system uses the dirty paper coding to cancel the interference among the users and the transmitting end accurately knows the users' channel information, channel capacity can be raised by canceling the interference among the users. Nevertheless, canceling the interference among the users using the dirty paper coding is considered to be impossible to implement due to the complexity of the transmitting end.

If the multiuser multi-antenna system uses the block diagonalization to cancel the interference among the users, however, the complexity of the transmitting end can be reduced, compared to the complexity of dirty paper coding, by allocating the next user to a null space of the channel of a specific user selected from the users to be serviced and sequentially canceling the interference. To achieve the maximum sum rate of block diagonalization, however, each user needs to know the decoding information obtained form the transmitting end. In order to do so, the transmitting end needs to send the decoding information to each user via coordinated information.

As discussed above, the transmitting end of the multiuser multi-antenna system transmits the signal using the precoding to mitigate the interference among the serviced users. When the transmitting end employs the linear interference cancellation scheme, however, its implementation can be simplified but results in performance degradation. When using the nonlinear interference cancellation scheme, performance is quite good but complexity increases.

Therefore, a novel precoding method is required for achieving a high level of performance while lowering the complexity of the multiuser multi-antenna system.

SUMMARY OF THE INVENTION

An aspect of the present invention is to address at least the above-mentioned problems and/or disadvantages and to provide at least the advantages described below. Accordingly, an aspect of the present invention is to provide a precoder and a precoding method in a multiuser multi-antenna system.

Another aspect of the present invention is to provide an apparatus and method for realizing low complexity and optimal performance and canceling interference among terminals in a multiuser multi-antenna system.

Yet another aspect of the present invention is to provide an apparatus and a method for maximizing a sum rate using inverse channels of transmitting end in a multiuser multi-antenna system.

Still another aspect of the present invention is to provide an apparatus and a method for selectively using an inter-terminal interference cancellation scheme based on a transmit symbol power in a multiuser multi-antenna system.

According to one aspect of the present invention a precoder in a multiuser multi-antenna system is provided. The system includes a channel checker for determining a DownLink (DL) channel condition of terminals in a service coverage area, a pre-compensator for selecting a nonlinear algorithm according to a feedback scheme of channel state information from the terminals, and for pre-compensating, for a channel distortion, signals to be sent to the terminals by applying the selected nonlinear algorithm, and an interference remover for canceling interference in a channel by multiplying the pre-compensated signals by inverse channels of the terminals, and for canceling interference between the terminals without coordinated information.

According to one aspect of the present invention, a precoding method in a multiuser multi-antenna system is provided. The system includes determining a DL channel condition of terminals in a service coverage area, selecting a nonlinear algorithm according to a feedback scheme of channel condition of the terminals, pre-compensating for a channel distortion in signals to be sent to the terminals by applying the selected nonlinear algorithm, canceling interference in a channel by multiplying the pre-compensated signals by inverse channels of the terminals, and canceling interference between the terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for maximizing a channel capacity by adaptively selecting a precoding scheme according to channel information of terminals in a multiuser multi-antenna system.

Hereafter, it is assumed that a transmitting end of the multi-antenna system can accurately estimate DownLink (DL) channel information of terminals from an UpLink (UL) sounding signal or an analog feedback signal received from the terminals in a service coverage area. The description of the transmitting end being a base station and a receiving end being a user terminal is merely exemplary.

Figure 1:
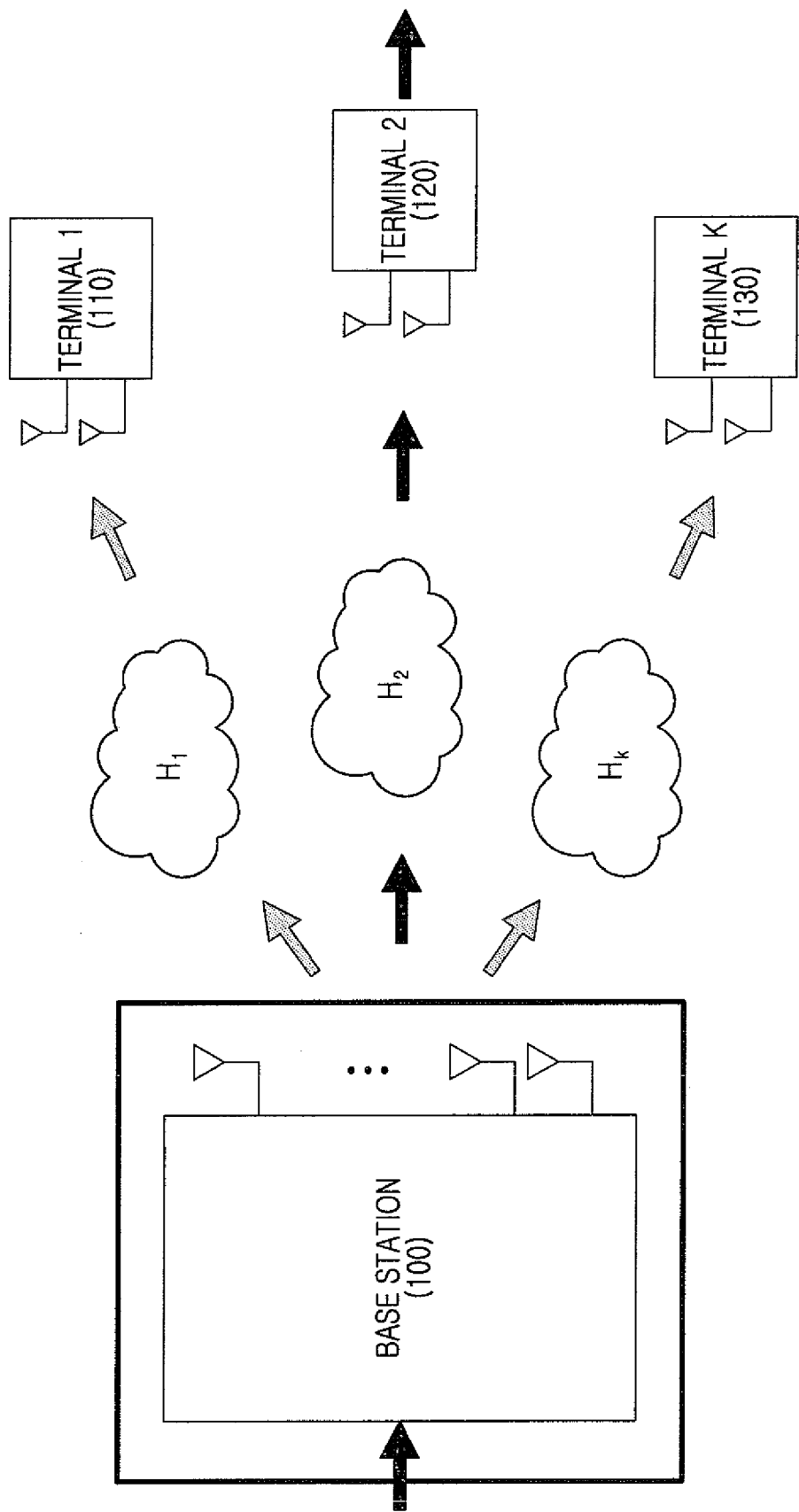
FIG. 1 is a block diagram of a multiuser multi-antenna system according to an exemplary embodiment of the present invention.

A multiuser multi-antenna system according to an exemplary embodiment of the present invention is shown in FIG. 1.

FIG. 1 is a block diagram of the multiuser multi-antenna system according to an exemplary embodiment of the present invention.

The multiuser multi-antenna system of FIG. 1 includes a base station 100 including a plurality of antennas (NT-ary antennas), and a plurality of terminals 110, 120 and 130 serviced from the base station 100 and each including a plurality of antennas.

The base station 100 selects terminals 110, 120 and 130 to be serviced using DL channel information of the terminals acquired from feedback information received from terminals in its service coverage area.

Next, the base station 100 provides the service to the selected terminals 110, 120 and 130 using different space resources $H_1$, $H_2$ and $H_k$ acquired through the simultaneous use of the plurality of the antennas during the same time resource. In doing so, the base station 100 uses a hybrid precoder which precodes signals transmitted to the terminals by applying a linear precoding scheme and a nonlinear precoding scheme. The terminals decode the received signal in the same manner as the hybrid precoding scheme of the base station 100. Specifically, when the base station 100 sends the signal using the hybrid precoder, the terminals receiving the signal from the base station 100 decode the signal using the same nonlinear scheme as the nonlinear scheme selected by the base station 100 to send the signal.

Figure 2:
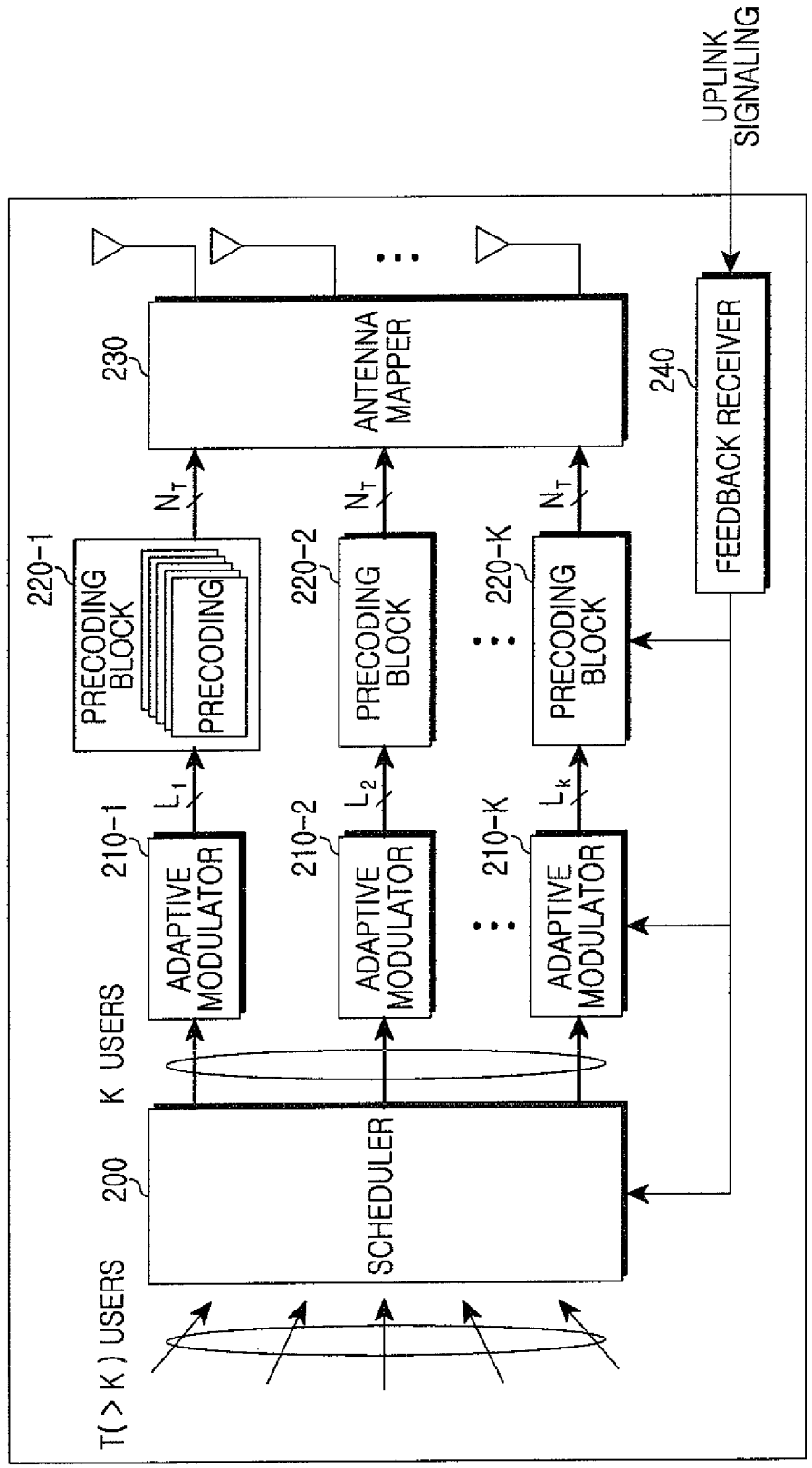
FIG. 2 is a block diagram of a transmitting end in the multiuser multi-antenna system according to an exemplary embodiment of the present invention.
Figure 6:
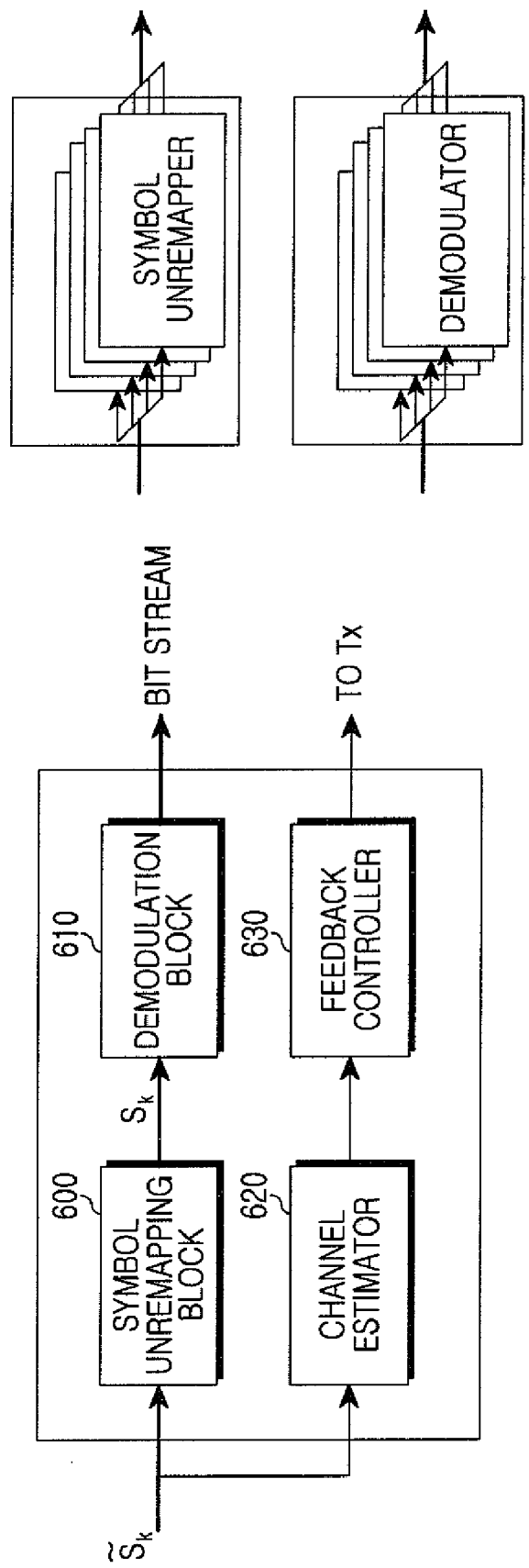
FIG. 6 is a block diagram of a receiving end in the multiuser multi-antenna system according to an exemplary embodiment of the present invention.

The base station is constituted as shown in FIG. 2. The terminals are constituted as shown in FIG. 6.

FIG. 2 is a block diagram of a transmitting end in the multiuser multi-antenna system according to an exemplary embodiment of the present invention.

The base station of FIG. 2 includes a scheduler 200, adaptive modulators 210-1, 210-2 and 210-K, precoding blocks 220-1, 220-2 and 220-K, an antenna mapper 230, and a feedback receiver 240.

The feedback receiver 240 receives signals fed back from the terminals in the service coverage area of the transmitting end and determines DL channel information of the terminals. For example, the feedback receiver 240 determines DL channel information from an UL sounding signal, an analog feedback signal, or a Channel Quality Indicator (CQI) contained in a feedback bit, which is received from the terminals. Herein, the CQI not only indicates a Signal to Noise Ratio (SNR) but also includes channel state information, SNR index, channel capacity index, and codebook index.

The scheduler 200 selects terminals to service using the channel information of the terminals provided from the feedback receiver 240. For example, the scheduler 200 selects K-ary terminals having good channel conditions among the terminals in the service coverage area.

The adaptive modulators 210-1, 210-2 and 210-K adaptively modulate signals to be sent to the terminals selected at the scheduler 200 according to the channel conditions of the terminals. For example, the first adaptive modulator 210-1 modulates a signal to be sent to the first terminal at a modulation level (e.g., Modulation and Coding Scheme (MCS) level) determined based on the channel information of the first terminal selected at the scheduler 200. The $K^{th}$ adaptive modulator 210-K modulates a signal to be sent to the $K^{th}$ terminal at a modulation level determined based on the channel information of the $K^{th}$ terminal.

The precoding blocks 220 precode the signals output from the adaptive modulators 210 to cancel interference between the terminals. Herein, the precoding blocks 220-1, 220-2 and 220-K are constituted by taking into account the number of the terminals selected at the scheduler 200 and the number of the transmit antennas.

Figure 3:
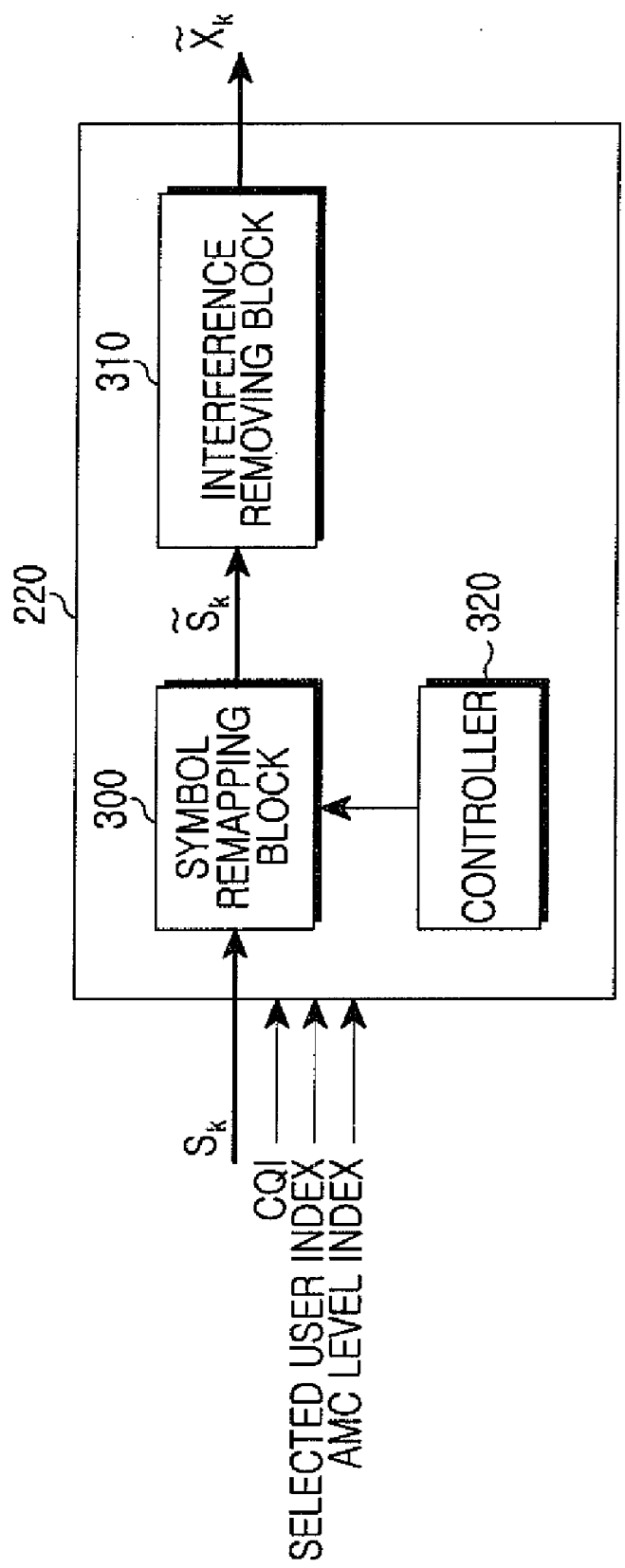
FIG. 3 is a detailed block diagram of a precoding block in the multiuser multi-antenna system according to an exemplary embodiment of the present invention.

For example, each of the precoding blocks 220-1, 220-2 and 220-K include a symbol remapping block 300, an interference removing block 310, and a controller 320 as shown in the precoding block 220 of FIG. 3. The symbol remapping block 300 and the interference removing block 310 include symbol remappers and interference cancellers for the signals to be sent to the terminals.

The antenna mapper 230 maps the precoded signals output from the precoding blocks 220-1, 220-2 and 220-K to the antennas and transmits the signals to the terminals selected by the scheduler 200.

FIG. 3 is a detailed block diagram of a precoding block in the multiuser multi-antenna system according to an exemplary embodiment of the present invention.

The precoding block 220 of FIG. 3 includes the symbol remapping block 300, the interference removing block 310, and the controller 320.

The controller 320 determines a nonlinear precoding scheme for minimizing a power of a transmit signal when the interference removing block 310 pre-compensates for channel distortion using the linear approach according to the feedback scheme of the channel information from the terminals. For example, when the terminals feed back using an analog feedback scheme or a channel sounding scheme, the controller 320 performs nonlinear precoding by selecting the nonlinear precoder of FIG. 4A. When the terminals feed back using a CQI scheme, the controller 320 performs nonlinear precoding by selecting the nonlinear precoder of FIG. 4B.

When the interference removing block 310 pre-compensates for the channel distortion using the linear scheme, the symbol remapping block 300 generates a signal having its power minimized based on the nonlinear precoding scheme determined to minimize the power of the transmit signal under the control of the controller 320. The symbol remapping block 300 generates a transmit signal having its power minimized through the vector perturbation determined under the control of the controller 320.

The symbol remapping block 300 lowers the power per transmit symbol or a Peak to Average Power Ratio (PAPR) by pre-compensating the channel distortion of the transmit signal. Herein, the symbol remapping block 300 pre-compensates for the channel distortion using the user index of the terminals selected at the scheduler 200, an Adaptive Modulation and Coding (AMC) level index of the terminals, and the CQI of the terminals provided from the feedback receiver 240.

Figure 4A:
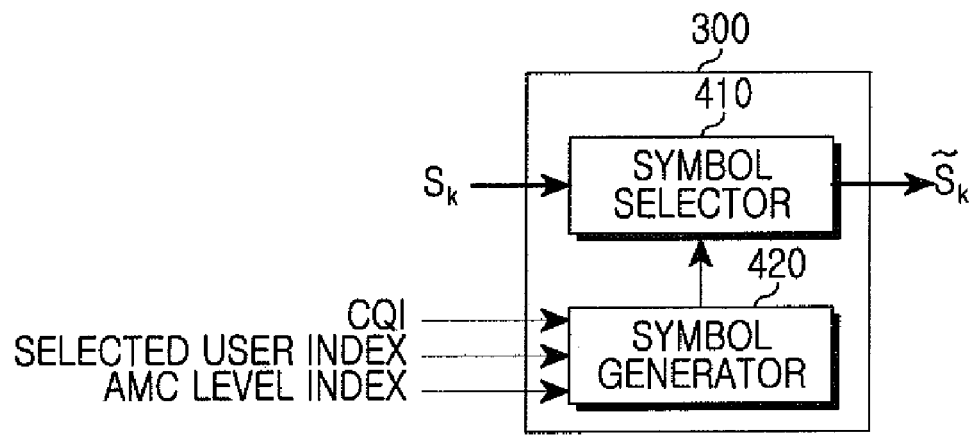
FIGS. 4A and 4B are detailed block diagrams of a symbol remapping block in the multiuser multi-antenna system according to an exemplary embodiment of the present invention.
Figure 4B:
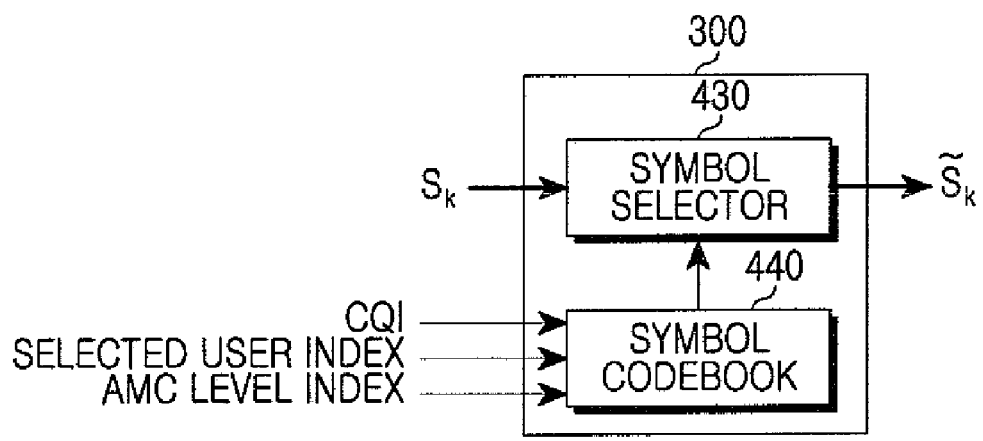

When using a vector perturbation of the respective nonlinear approaches, exemplary symbol remapping blocks 300 are constituted as shown in FIGS. 4A and 4B.

The interference removing block 310 cancels interference in the base station's channel from the terminals and interference with the other terminals in the signal output from the symbol remapping block 300. If the base station transmits a signal via a plurality of transmit antennas and the terminal receives the signal via a plurality of receiving antennas, the terminal receives the overlapping signals, which are transmitted over the plurality of the transmit antennas, at the single receiving antenna. As a result, interference to the base station's own channel occurs.

Figure 5:
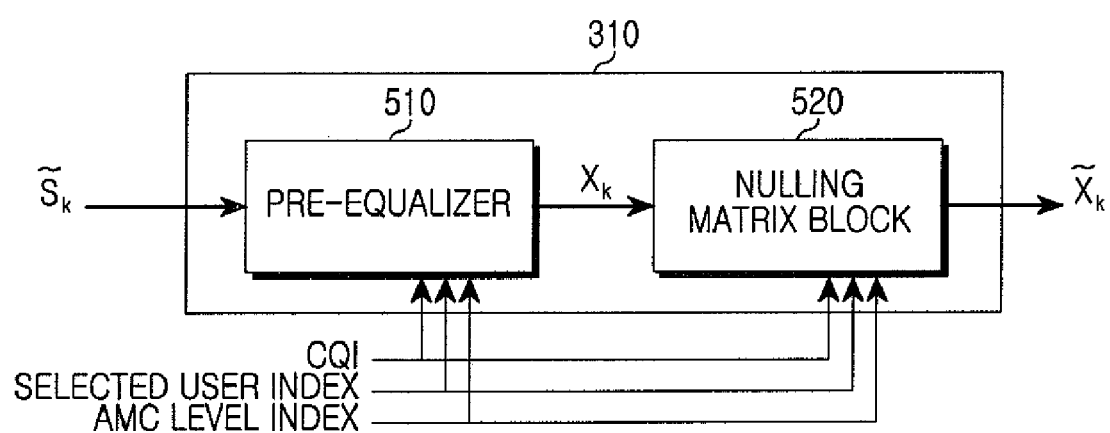
FIG. 5 is a detailed block diagram of an interference removing block in the multiuser multi-antenna system according to an exemplary embodiment of the present invention.

An exemplary interference removing block 310 is constituted as shown in FIG. 5.

FIGS. 4A and 4B are detailed block diagrams of a symbol remapping block in the multiuser multi-antenna system according to an exemplary embodiment of the present invention.

FIG. 4A shows a symbol remapping block 300 which generates perturbing symbols and performs the vector perturbation. FIG. 4B shows a symbol remapping block 300 which selects the perturbing symbol based on the codebook and performs the vector perturbation.

The symbol remapping block 300 of FIG. 4A includes a symbol selector 410 and a symbol generator 420.

The symbol generator 420 generates perturbing symbols using the user index of the terminals selected at the scheduler 200, the AMC level index of the terminals, and the CQI of the terminals. Herein, the perturbing symbols are symbols modified from the modulation symbols of the corresponding modulation scheme based on the channels so as to perform the vector perturbation. The symbol generator 420 can be implemented using a minimum transmit symbol power scheme or a minimum PAPR scheme.

The symbol selector 410 selects and outputs the perturbing symbol which satisfies Equation (1) among the perturbing symbols generated at the symbol generator 420.

$$P_k = P'_k \in ACZ^{L_k} \overset{argmin}{} \|H_{eff,k}^{-1}(S_k + P'_k)\|^2 \quad (1)$$
$$= P'_k \in ACZ^{L_k} \overset{argmin}{} \|H_{eff,k}^{-1}\tilde{S}_k\|^2$$

In Equation (1), $P_k$ indicates the $k^{th}$ perturbing symbol, $H_{eff,k}$ indicates the channel constituted with the channels of the terminals, and $S_k$ indicates the input signal.

When the symbols of the transmit signal are mapped to the perturbing symbols based on Equation (1) for the pre-compensation of the transmit signal, the symbol selector 410 selects the perturbing symbol which minimizes the magnitude or power of the transmit signal.

The symbol selector 410 can enhance the SNR of the signals to be sent to the terminals through the perturbation based on Equation (1).

The symbol remapping block 300 of FIG. 4B includes a symbol selector 430 and a symbol codebook 440.

The symbol codebook 440 selects perturbing symbols from a symbol codebook pre-defined using the user index of the terminals selected at the scheduler 200, the AMC level index of the terminals, and the CQI of the terminals. Herein, the symbol codebook 440 generates the symbol codebook using a Grassmannian algorithm, a Givens rotation matrix, or a Lloyd algorithm.

When the symbols of the transmit signal are mapped to the perturbing symbols using Equation (1) for the pre-compensation of the transmit signal, the symbol selector 430 selects a perturbing symbol which minimizes the magnitude or power of the transmit signal among the perturbing symbols selected at the symbol codebook 440.

FIG. 5 is a detailed block diagram of an interference removing block in the multiuser multi-antenna system according to an exemplary embodiment of the present invention.

The interference removing block 310 of FIG. 5 includes a pre-equalizer 510 and a nulling matrix block 520.

The pre-equalizer 510 performs pre-equalization based on an inverse channel of the base station's channel to mitigate the base station's channel interference in the signals provided from the symbol remapping block 300. The pre-equalizer 510 can adopt the ZF or the MMSE.

The nulling matrix block 520 cancels the interference between the terminals in the signal output from the pre-equalizer 510. In more detail, the nulling matrix block 520 removes the interference between the terminals by canceling the channel matrixes of the interfering terminals from the channel matrixes of the terminals to be serviced.

FIG. 6 is a block diagram of a receiving end in a multiuser multi-antenna system according to an exemplary embodiment of the present invention.

The terminal of FIG. 6 includes a symbol unremapping block 600, a demodulation block 610, a channel estimator 620, and a feedback controller 630.

The symbol unremapping block 600 converts the symbols of the signal received on the receiving antennas to the un-precoded symbols. As mentioned above, the base station remaps the symbols to pre-compensate for the distortion in the symbols of the transmit signal at the symbol remapping block 300. Accordingly, the symbol unremapping block 600 converts the remapped symbols of the receive signal to the un-remapped symbols.

The symbol unremapping block 600 determines the nonlinear precoding scheme according to the feedback scheme of the channel information to the base station. For example, when the feeding back adopts the analog feedback scheme or the channel sounding scheme, the symbol unremapping block 600 selects the nonlinear precoding scheme according to the nonlinear precoder of FIG. 7A. When the CQI scheme is used for the feedback, the symbol unremapping block 600 selects the nonlinear precoding scheme according to the nonlinear precoder of FIG. 7B.

Figure 7A:
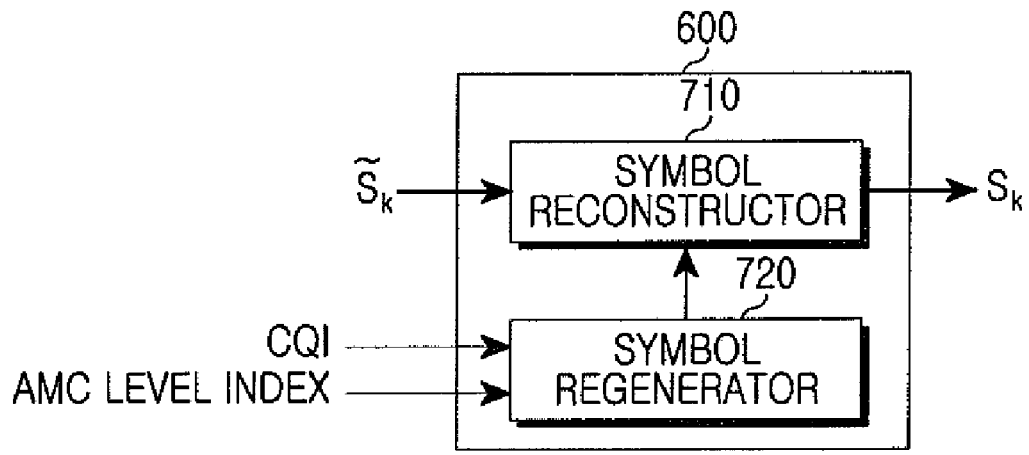
FIGS. 7A and 7B are detailed block diagrams of a symbol unremapper of the receiving end in the multiuser multi-antenna system according to an exemplary embodiment of the present invention.
Figure 7B:
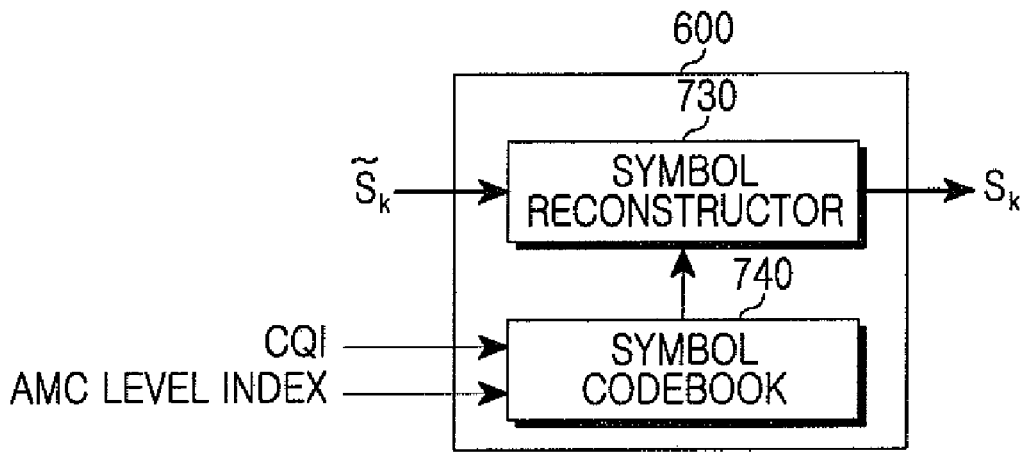

When the symbol remapping block 300 of the transmitting end remaps the symbols using the vector perturbation, an exemplary symbol unremapping block 600 is constituted as shown in FIGS. 7A and 7B.

The demodulation block 610 demodulates the signal output from the symbol unremapping block 600 according to the corresponding modulation level. In doing so, the demodulation block 610 demodulates the signal at the same modulation level as the modulation level adaptively determined at the base station based on the channel condition.

The channel estimator 620 estimates the DL channel using the signal received on the receiving antennas. The channel estimator 620 estimates the channel using the pilot signal of the receive signal.

The feedback controller 630 feeds back the channel information estimated at the channel estimator 620 to the base station in the form of the UL sounding signal or the analog feedback.

FIGS. 7A and 7B are detailed block diagrams of a symbol unremapping block of the receiving end in the multiuser multi-antenna system according to an exemplary embodiment of the present invention.

FIG. 7A shows a symbol unremapping block which regenerates the perturbing symbol, and FIG. 7B shows a symbol unremapping block which selects the perturbing symbol based on the codebook.

The symbol unremapping block 600 of FIG. 7A includes a symbol reconstructor 710 and a symbol regenerator 720.

The symbol regenerator 720 regenerates the perturbing symbols using the AMC level index based on the DL channel condition and the DL CQI. That is, the symbol regenerator 720 generates the same perturbing symbols as in the symbol generator 420 of FIG. 4A. Herein, the perturbing symbols are the symbols modified from the modulation symbols of the corresponding modulation scheme based on the channel to perform the vector perturbation.

The symbol reconstructor 710 converts the symbols of the received signal into the unremapped symbols using the perturbing symbols generated at the symbol regenerator 720.

Next, the symbol unremapping block 600 of FIG. 7B includes a symbol reconstructor 730 and a symbol codebook 740.

The symbol codebook 740 selects perturbing symbols from the predefined symbol codebook using the AMC level index based on the DL channel condition and the DL CQI. Herein, the symbol codebook 740 generates the symbol codebook using the Grassmannian algorithm, the Givens rotation matrix, or the Lloyd algorithm.

The symbol reconstructor 730 converts the symbols of the received signal to the unremapped symbols using the perturbing symbols selected at the symbol codebook 740.

Now, an exemplary precoding method of the base station constituted as above is explained.

Figure 8:
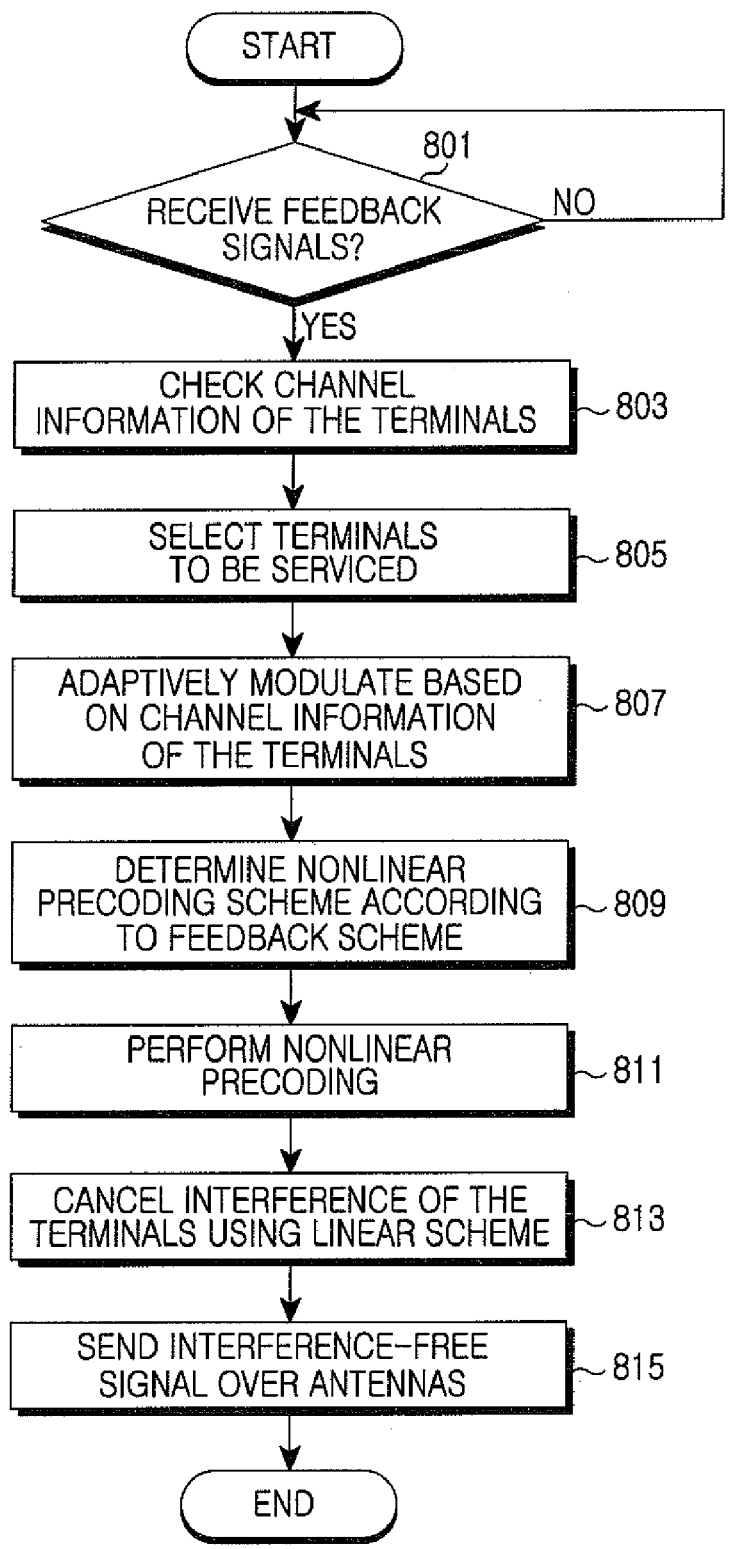
FIG. 8 is a flowchart of operations of a transmitting end in the multiuser multi-antenna system according to an exemplary embodiment of the present invention.

FIG. 8 is a flowchart of operations of a transmitting end in a multiuser multi-antenna system according to an exemplary embodiment of the present invention.

In step 801, the base station determines whether feedback signals are received from the terminals in the base station's service coverage area.

Upon receiving the feedback signals, the base station determines the DL channel information of the terminals from the feedback information in step 803.

In step 805, the base station selects terminals to be serviced using the DL channel information of the terminals.

In step 807, the base station adaptively modulates signals to be sent to the terminals using the modulation level (e.g., MCS level) that has been determined based on the DL channel information of the terminals.

In step 809, the base station determines the nonlinear precoding scheme according to the feedback scheme of the terminals. For example, when the terminals feed back using the analog feedback scheme or the channel sounding scheme, the base station selects the nonlinear precoding scheme according to the nonlinear precoder of FIG. 4A. When the terminals feed back using the CQI scheme, the base station selects the nonlinear precoding scheme according to the nonlinear precoder of FIG. 4B.

In step 811, the base station pre-compensates the transmit signal according to the selected nonlinear precoding scheme to minimize the power of the transmit signal when the channel distortion is pre-compensated using the linear scheme. For example, the base station can pre-compensate for the channel distortion of the transmit signal for the terminals using the vector perturbation. In particular, the base station generates perturbing symbols using the user index of the terminals selected to be serviced in step 805, the AMC level index of the terminals, and the CQI of the terminal, or selects perturbing symbols from a predefined codebook. Next, when the symbols of the transmit signal are mapped to the perturbing symbols for the pre-compensation of the transmit signal using Equation (1), the base station selects the perturbing symbol which minimizes the magnitude or power of the transmit signal.

In step 813, the base station cancels interference between the multiple terminals in the pre-compensated signal using the linear scheme. In doing so, the base station cancels interference in its channel by multiplying the signals to be sent to the terminals by its inverse channel. The base station also rejects the interference between the terminals by canceling channel matrixes of the interfering terminals from the matrixes of the terminals.

In step 815, the base station maps the interference-free signals to the transmit antennas and sends the signals to the terminals.

Next, the base station ends this process.

Now, exemplary operations of a terminal for receiving a signal from a base station are illustrated.

Figure 9:
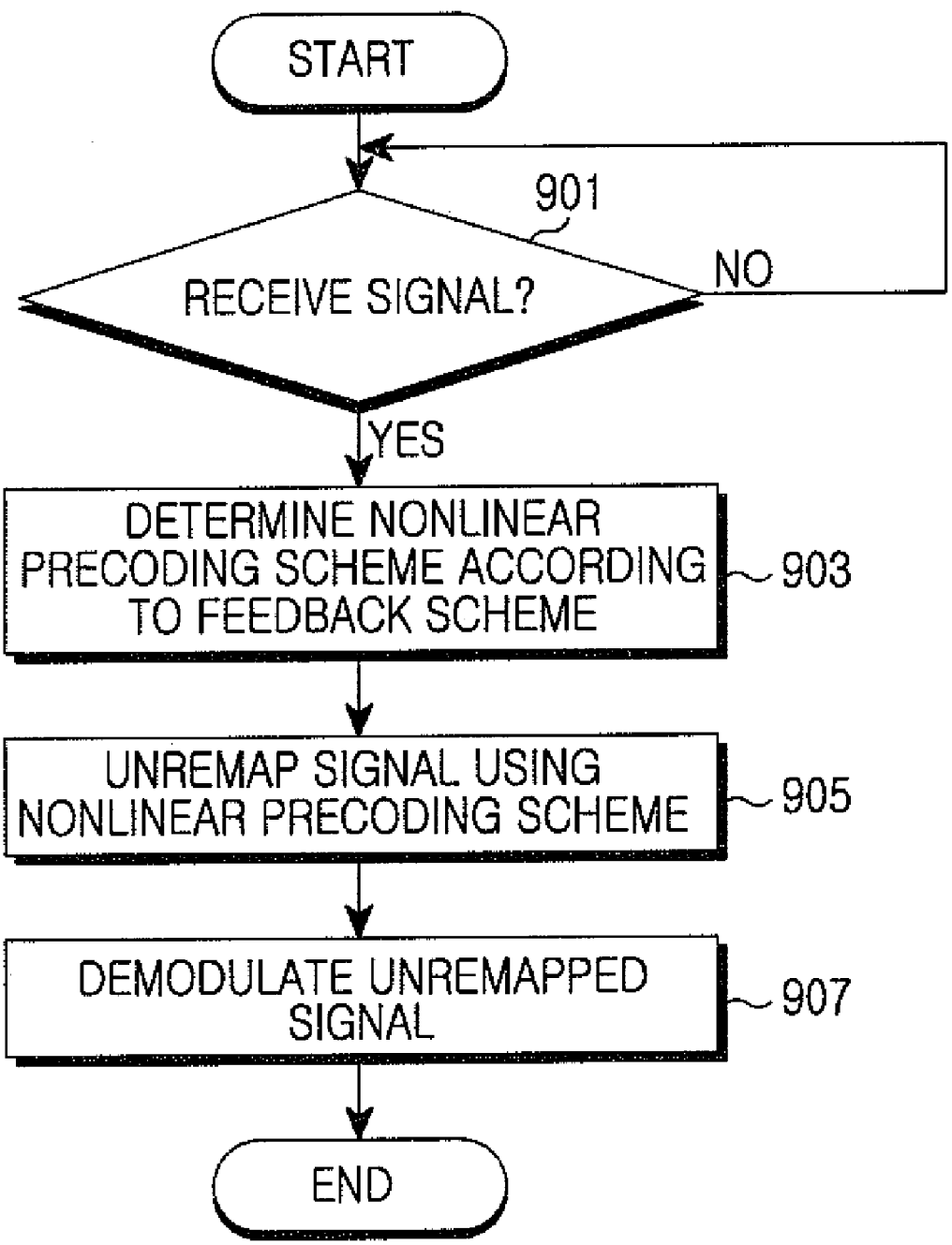
FIG. 9 is a flowchart of operations of a receiving end in the multiuser multi-antenna system according to an exemplary embodiment of the present invention.

FIG. 9 is a flowchart of operations of a receiving end in a multiuser multi-antenna system according to an exemplary embodiment of the present invention.

In step 901, the terminal determines whether a signal is received from the base station via the plurality of the antennas.

Upon receiving the signal, the terminal determines the nonlinear precoding scheme according to the feedback scheme of the channel information to the base station in step 903. For example, when the feeding back adopts the analog feedback scheme or the channel sounding scheme, the terminal selects the nonlinear precoding scheme according to the nonlinear precoder of FIG. 7A. When the CQI scheme is used for the feedback, the terminal selects the nonlinear precoding scheme according to the nonlinear precoder of FIG. 7B.

Next, the terminal converts the remapped symbols of the received signal precoded at the base station using the selected nonlinear schemes into the unremapped symbols in step 905.

In step 907, the terminal demodulates the unremapped signals according to the corresponding modulation level. Since the received signal is modulated at the modulation level adaptively determined at the transmitting end based on the DL channel information, the terminal demodulates the received signal at the same modulation level as the modulation level adaptively determined based on the DL channel condition.

Next, the terminal ends this process.

Although it is not illustrated, the terminal estimates the DL channel from the received signal and feeds back the estimated channel information to the base station.

Hereafter, explanations are provided for the performance change when the interference in the base station's own channel is canceled using the base station's inverse channel in the multiuser multi-antenna system.

Figure 10:
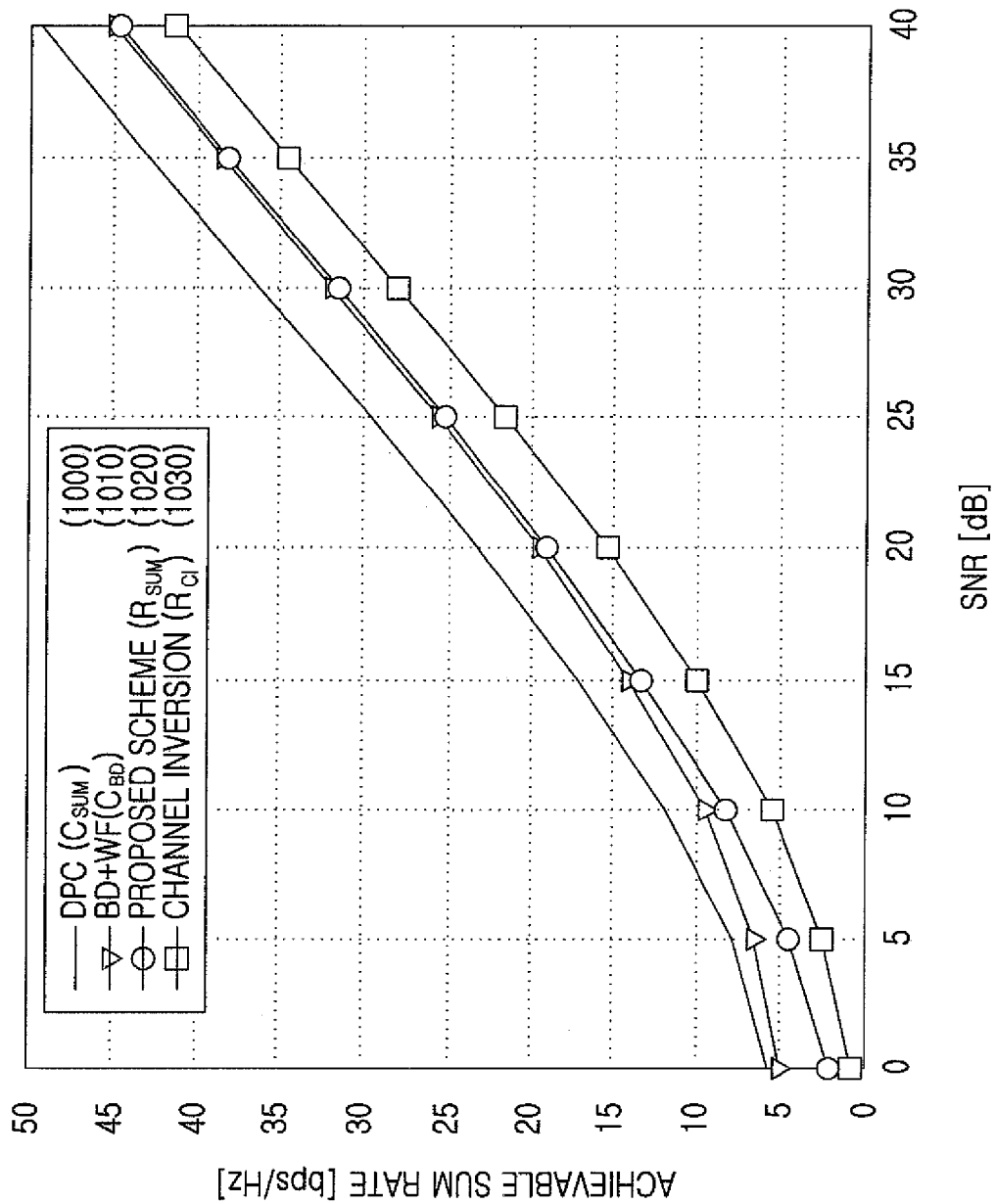
FIG. 10 is a graph of a sum rate of channel capacities of the users according to an exemplary embodiment of the present invention.

FIG. 10 is a graph of a sum rate of channel capacities of the terminals according to an exemplary embodiment of the present invention. The horizontal axis indicates the SNR and the vertical axis indicates the sum rate of the channel capacities of the multiple terminals.

FIG. 10 compares the bit error rate of the conventional dirty paper coding 1000, the conventional block diagonalization 1010, the precoding 1020 and the channel inversion 1030 of an exemplary embodiment of the present invention in the multiuser multi-antenna system.

The conventional dirty paper coding 1000 exhibits a higher data rate than the block diagonalization 1010, the proposed precoding 1020 and the channel inversion 1030. However, the dirty paper coding 1000 is subject to the higher complexity than the block diagonalization 1010 and the proposed precoding 1020.

The proposed precoding 1020 and the block diagonalization 1010 exhibit a similar data rate. However, the block diagonalization 1010 needs to perform a Singular Value Decomposition (SVD) and transmit the singular value to the terminals so that the other terminals can confirm the channel information. In contrast, the proposed precoding 1020 does not need to send a separate signal for the interference cancellation between the terminals because it multiples the signal by its inverse channel.

Figure 11:
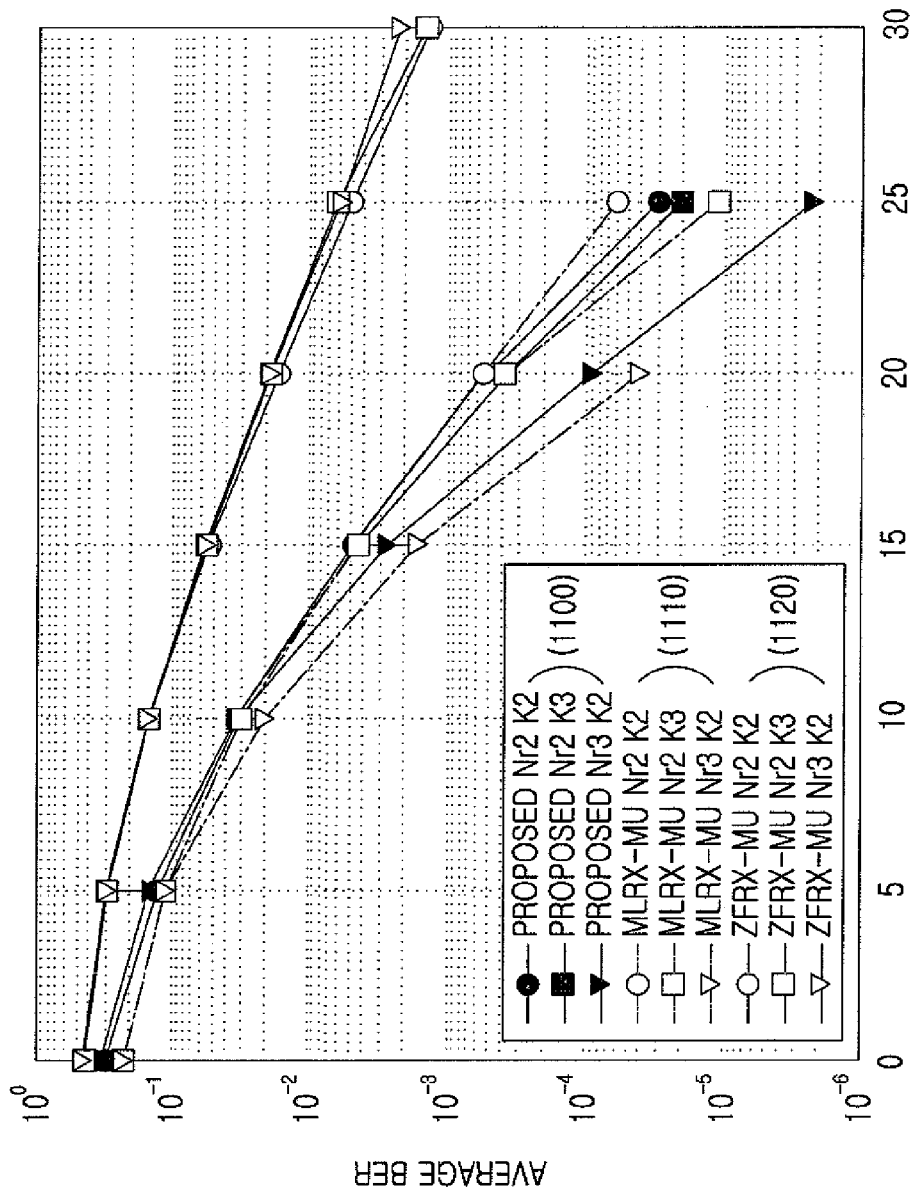
FIG. 11 is a graph of a bit error rate according to an exemplary embodiment of the present invention.

FIG. 11 is a graph of a bit error rate according to an exemplary embodiment of the present invention. The horizontal axis indicates the SNR and the vertical axis indicates the bit error rate.

In FIG. 11, the bit error rate is compared in relation with a proposed precoding 1100, a nonlinear precoding 1110, and a linear precoding 1120.

The proposed precoding 1100 and the nonlinear precoding 1110 exhibit a lower bit error rate than the linear precoding 1120.

Figure 12:
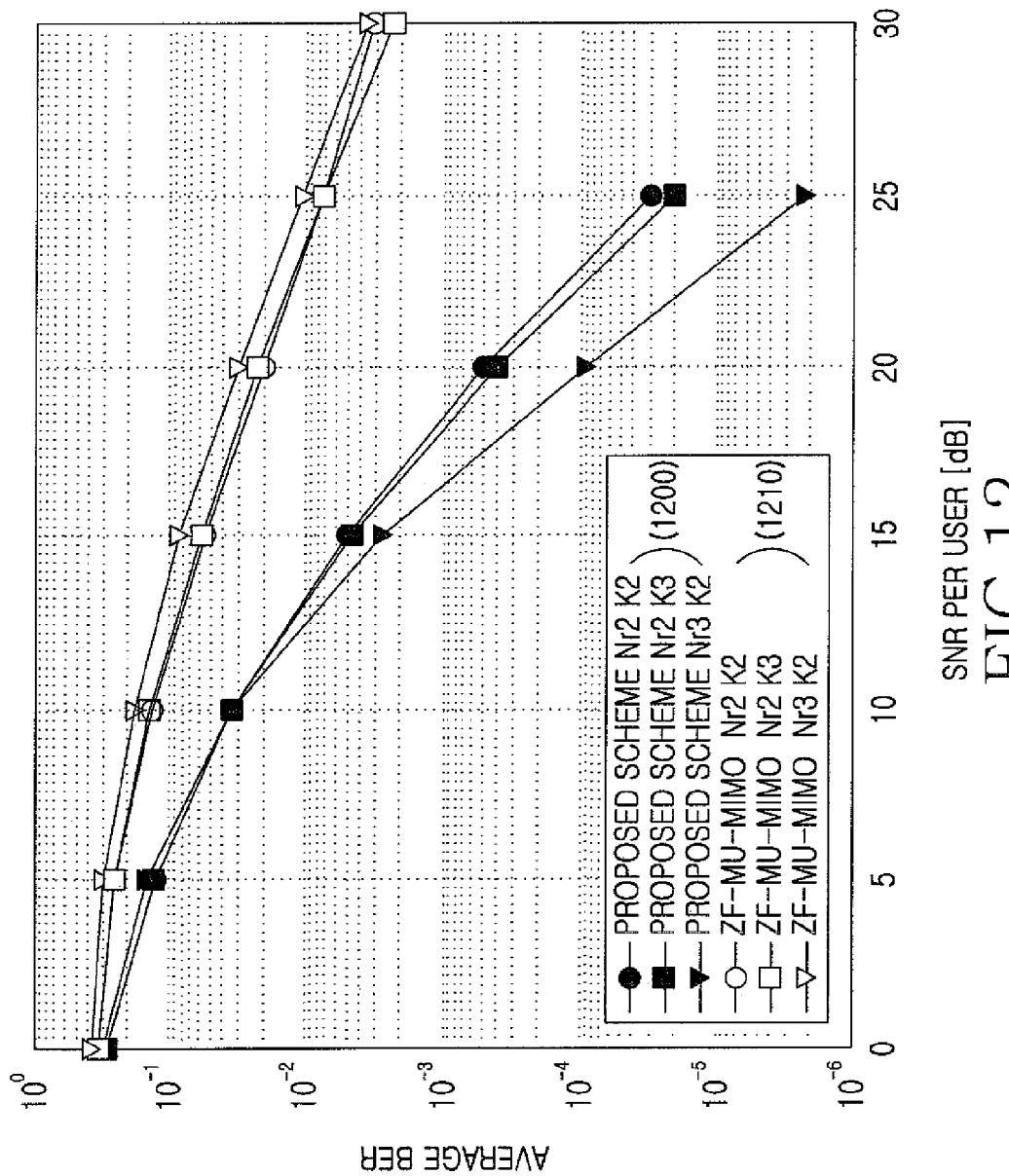
FIG. 12 is a graph of a bit error rate according to another exemplary embodiment of the present invention.

FIG. 12 is a graph of a bit error rate according to another exemplary embodiment of the present invention. The horizontal axis indicates the SNR and the vertical axis indicates the bit error rate.

In FIG. 12, the bit error rate is compared in relation with a proposed precoding 1200 and a linear precoding 1210.

The proposed precoding 1200 attains a lower bit error rate than the linear precoding 1210.

As set forth above, the precoding scheme is adaptively selected based on the channel information of the terminals and the channel interference is canceled using the inverse channels of the terminals in the multiuser multi-antenna system. Therefore, the pre-equalization can be carried out without global channel state information and the increase in transmit power in the permutation can be avoided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A precoder in a multiuser multi-antenna system, comprising:
   a channel checker for determining a DownLink (DL) channel condition of terminals in a service coverage area;
   a pre-compensator for selecting a nonlinear algorithm according to a feedback scheme of channel state information from the terminals, and for pre-compensating, for a channel distortion of signals to be sent to the terminals by applying the selected nonlinear algorithm; and
   an interference remover for canceling interference in a channel by multiplying the pre-compensated signals by inverse channels of the terminals, to cancel interference between the terminals,
   wherein the feedback scheme includes at least one of an analog feedback scheme, a channel sounding scheme and a Channel Quality Indicator (CQI) scheme, and wherein the pre-compensator selects a first nonlinear algorithm when the terminals feed back the channel state information using at least one of the analog feedback scheme and the channel sounding scheme, and selects a second nonlinear algorithm when the terminals feed back the channel state information using the CQI scheme.

2. The precoder of claim 1, wherein the channel checker determines the channel condition of the terminals using signals fed back from the terminals.

3. The precoder of claim 1, further comprising:
a scheduler for selecting terminals to be serviced based on channel state information of the terminals; and
an adaptive modulator for adaptively modulating signals to be sent to the terminals based on the channel condition of the selected terminals and for outputting the modulated signals to the pre-compensator.

4. The precoder of claim 1, wherein the pre-compensator comprises:
a symbol generator for generating perturbing symbols based on the channel condition of the terminals to perform a vector perturbation, when the terminals feed back the channel state information using at least one of an analog feedback scheme and a channel sounding scheme; and
a symbol selector for selecting a perturbing symbol which minimizes a magnitude of a transmit power of the signals to be sent to the terminals from among the perturbing symbols generated at the symbol generator.

5. The precoder of claim 4, wherein the symbol generator generates the perturbing symbols using at least one of a minimum transmit symbol power algorithm and a minimum Peak to Average Power Ratio (PAPR) algorithm.

6. The precoder of claim 4, wherein the symbol generator generates the perturbing symbols using at least one of information relating to the terminals to be serviced, channel statue information of the terminals and adaptive modulation information.

7. The precoder of claim 1, wherein the pre-compensator comprises:
a symbol codebook for selecting perturbing symbols, based on the channel condition of the terminals, from a codebook which comprises perturbing symbols based on the channel condition for the vector perturbation, when the terminals feed back the channel state information using a CQI scheme; and
a symbol selector for selecting a perturbing symbol which minimizes a magnitude of a transmit power of the signals to be sent to the terminals from among the perturbing symbols selected at the symbol codebook.

8. The precoder of claim 7, wherein the symbol codebook generates the codebook using at least one of a Grassmannian algorithm, a Givens rotation matrix and a Lloyd algorithm.

9. The precoder of claim 7, wherein the symbol codebook selects the perturbing symbols in a predetermined codebook using at least one of information relating to the terminals to be serviced, channel state information of the terminals and adaptive modulation information.

10. The precoder of claim 1, wherein the interference remover comprises:
a pre-equalizer for canceling the interference in the channel by multiplying the pre-compensated signals by the inverse channels; and
an interference removing part for canceling the interference between the terminals from the pre-equalized signal.

11. The precoder of claim 10, wherein the pre-equalizer uses at least one of a Zero-Forcing (ZF) scheme and a Minimum Mean Square Error (MMSE) scheme.

12. The precoder of claim 1, further comprising:
an antenna mapper for mapping the interference-free signals to one or more antennas and transmitting the signals to the terminals.

13. A precoding method in a multiuser multi-antenna system, comprising:
determining a DownLink (DL) channel condition of terminals in a service coverage area;
selecting a nonlinear algorithm according to a feedback scheme of channel condition of the terminals;
pre-compensating for a channel distortion in signals to be sent to the terminals by applying the selected nonlinear algorithm;
canceling interference in a channel by multiplying the pre-compensated signals by inverse channels of the terminals; and
canceling interference between the terminals,
wherein the feedback scheme includes at least one of an analog feedback scheme, a channel sounding scheme and a Channel Quality Indicator (CQI) scheme, and
wherein the selecting of the nonlinear algorithm comprises:
selecting a first nonlinear algorithm when the terminals feed back the channel state information using at least one of the analog feedback scheme and the channel sounding scheme; and
selecting a second nonlinear algorithm when the terminals feed back the channel state information using the CQI scheme.

14. The precoding method of claim 13, further comprising:
selecting terminals to be serviced based on channel state information of the terminals; and
adaptively modulating signals to be sent to the terminals based on the channel condition of the selected terminals,
wherein the adaptively modulated signal is pre-compensated.

15. The precoding method of claim 13, wherein the pre-compensating using the nonlinear algorithm comprises:
generating perturbing symbols according to at least one of information relating to the terminals to be serviced, channel state information of the terminals and adaptive modulation information, to perform a vector perturbation, when the terminals feed back the channel state information using at least one of an analog feedback scheme and a channel sounding scheme; and
selecting a perturbing symbol which minimizes a magnitude of a transmit power of the signals to be sent to the terminals, among the generated perturbing symbols.

16. The precoding method of claim 15, wherein the perturbing symbols are generated using at least one of a minimum transmit symbol power algorithm and a minimum Peak to Average Power Ratio (PAPR) algorithm.

17. The precoding method of claim 13, wherein the pre-compensating using the nonlinear algorithm comprises:
selecting perturbing symbols in a codebook which comprises perturbing symbols based on the channel condition to perform a vector perturbation, according to at least one of information relating to terminals to be serviced, channel state information of the terminals and adaptive modulation information, when the terminals feed back the channel state information using a CQI scheme; and
selecting a perturbing symbol which minimizes a magnitude of a transmit power of the signals to be sent to the terminals, among the selected perturbing symbols.

18. The precoding method of claim 17, wherein codebook is generated using at least one of a Grassmannian algorithm, a Givens rotation matrix and a Lloyd algorithm.

19. The precoding method of claim 13, wherein the channel interference is cancelled using at least one of a Zero-Forcing (ZF) scheme and a Minimum Mean Square Error (MMSE) scheme.

20. The precoding method of claim 13, further comprising:

mapping the interference-free signals to at least one antenna and transmitting the signals to the terminals.

* * * * *